United States Patent [19]
Mugino et al.

[11] Patent Number: 5,764,825
[45] Date of Patent: Jun. 9, 1998

[54] OPTICAL WAVELENGTH DIVISION MULTIPLEXER DEVICE

[75] Inventors: Akira Mugino; Shuichi Tamura, both of Ichihara; Takeo Shimizu, Fujisawa, all of Japan

[73] Assignee: The Furukawa Electric Co. Ltd., Tokyo, Japan

[21] Appl. No.: 643,294

[22] Filed: May 8, 1996

[30] Foreign Application Priority Data

May 9, 1995 [JP] Japan .................. 7-135892

[51] Int. Cl.$^6$ .................. G02B 6/28; H04J 14/00
[52] U.S. Cl. .................. 385/24; 385/14; 385/31; 385/44; 385/45; 385/47; 385/49; 359/115; 359/124
[58] Field of Search .................. 385/14, 24, 31, 385/129, 130, 44, 45, 47, 49, 88; 359/115, 124, 127, 132

[56] References Cited

U.S. PATENT DOCUMENTS

| | | | |
|---|---|---|---|
| 4,575,180 | 3/1986 | Chang | 385/24 X |
| 4,790,614 | 12/1988 | Imoto et al. | 385/130 X |
| 5,002,350 | 3/1991 | Dragone | 385/24 X |
| 5,418,869 | 5/1995 | Seike et al. | 385/24 |
| 5,479,547 | 12/1995 | Kunikane et al. | 385/47 X |

FOREIGN PATENT DOCUMENTS

| | | | |
|---|---|---|---|
| 0 634 677 A1 | 4/1994 | European Pat. Off. | 385/24 X |
| 0 633 483 A1 | 6/1994 | European Pat. Off. | 385/24 X |
| 6-174954 | 7/1993 | Japan | 359/115 X |
| 7-98423 | 6/1994 | Japan | 359/115 X |
| 2175766 | 5/1986 | United Kingdom | 385/24 X |

OTHER PUBLICATIONS

A hybrid Integrated Optical WDM Transmitter/Receiver Module for Optical Subscriber Systems Utilizing a Planar Lightwave Circuit Platform; Y. Yamada; S. Suzuki; K. Moriwaki; Y. Hibino; Y. Tohmori; Y. Akastu; Y. Nagasuga; T. Hashimoto; H. Terui; M. Yanagisawa; Y. Inoue; Y. Akahori; R. Nagase (no date of publication).

Adiabatic 3-dB Coupler, Filters, and Multiplexers Made with Silica Waveguides on Silicon; R. Adar; Charles H. Henry; Rudolf F. Kazarinov; R.C. Kistler; and Gary R. Weber. Journal of Lightwave Technology, vol. 10, No. 1, Jan. 1992.

(List continued on next page.)

*Primary Examiner*—Brian Healy
*Attorney, Agent, or Firm*—Robert G. Lev

[57] ABSTRACT

The present invention proposes an optical wavelength division multiplexer device which has low through loss and low reflection loss, and also has high isolation. A filter member is made up from a filter base board upon which is formed a wavelength division filter 5, and is disposed so as to intersect an input and output optical waveguide 3 of rectilinear form part-way along it at an intersection angle α. When light which includes light of two different wavelengths $\lambda_1$ and $\lambda_2$ is incident through an incident light side of the input and output optical waveguide 3, the light of wavelength $\lambda_2$ passes through the wavelength division filter 5 and is emitted through an emitted light side, while the light of wavelength $\lambda_1$ is reflected by the wavelength division filter 5 in a direction separated from the input and output optical waveguide 3. A reflected light reception waveguide 1 is formed as rectilinear and is arranged in this reflection direction so as to receive the reflected light, with a gap being left between this reflected light reception waveguide 1 and the input and output optical waveguide 3, and the reflected light of wavelength $\lambda_1$ is received into a reflected light reception end thereof and is emitted from a received light after end portion thereof. By providing this gap between the input and output optical waveguide 3 and the reflected light reception waveguide 1, increase of loss due to mutual action between the incident light and the reflected light is restrained.

8 Claims, 5 Drawing Sheets

OTHER PUBLICATIONS

Application of Planar Lightwave Circuit Platform to Hybrid Integrated Optical WDM Transmitter/Receiver Module; Y. Yamada; S. Suzuki; K. Moriwaki; Y. Hibino; Y. Tohmori; Y. Akutsu; Y. Nakasuga; T. Hashimoto; H. Terui; M. Yanagisawa; Y. Inoue; Y. Akahori; and R. Nagase. Electronics Letters. 3rd Aug. 1995 vol. 31 No. 16.

Improved 8×8 Integrated Optical Matrix Switch Using Silica-Based Planar Lightwave Circuits; Masayuki Okuno. Journal of Lightwave Technology. vol. 12. No. 9 Sep. 1994.

Silica-based Optical Waveguide on Terraced Silicon Substrate as Hybrid Integration Platform; Y. Yamada; A. Takagi; I. Ogawa; M. Kawachi; M. Kobayashi. Electronics Letters 4th Mar. 1993. vol. 29 No. 5.

Optical Module with a Silica-Based Planaer Lightwave Circuit for Fiber-Optic Subscriber Systems; H. Terui; T. Kominato; K. Yoshino; F. Ichikawa; S. Hata; S. Sekine; M. Kobayashi; J. Yoshida; and K. Okada. IEEE Photonics Technology Letters. vol. 4 No. 6. Jun. 1992.

Dielectric Multilayered Interference Filters Deposited on Polyimide Films. Electronics Letters 25th Apr. 1991. vol. 27. No. 9.

Filter-Embedded Design and Its Applications to Passive Components. H. Yanagawa; T. Ochiai; H. Hayakawa. and H. Miyazawa. Journal of Lightwave Technology. vol. 7. No. 11. Nov. 1989.

OPTICAL WAVELENGTH DIVISION MULTIPLEXER DEVICE

FIELD OF THE INVENTION

The present invention relates to an optical wavelength division multiplexer device which has a function of dividing light into distinct channels or paths according to its wavelength such as is used for optical fiber signal transmission or the like, for example light for multi-wavelength multiplex signal transmission.

BACKGROUND OF THE INVENTION

In wavelength division multiplex an optical signal which includes light of a plurality of wavelengths is transmitted using a single optical path such as an optical fiber or the like, and the wavelengths are separated part way along the optical path or at a light signal reception end thereof. To separate a wavelength division multiplex transmission optical signal comprising a plurality of wavelengths into a plurality of distinct channels based upon wavelength, it is necessary to provide a light division device for separating the light beams of different wavelength. In order to achieve this end, several various prior art devices have been proposed; these include a diffraction grating type, a multi layer interference membrane filter type, a directionality linked device light waveguide type, a Mach-Zehnder interference waveguide type, and the like.

In FIG. 7, as an example of a light division device of the abovementioned multi layer interference membrane filter type, there is shown a light division device of the micro-optics type which was proposed in Japanese Patent Laying-Open Publication Serial No. Showa 59-198408. The light division device described therein comprises a Y-branched filter type of light division device in which a Y-branched waveguide 14 is formed upon a base plate 21, and a filter 25 is provided at a cutting portion 23 part way along the Y-branched waveguide 14; optical fibers 24a and 24b are connected to the side branches 22a and 22b of the Y-branched waveguide 14 respectively, while an optical fiber 24c is connected to the combined or input side 22c of the Y-branched waveguide 14.

This Y-branched filter type light division device performs wavelength division by the filter 25, the incident beam has two wavelengths $\lambda_1$ and $\lambda_2$ which are launched from the optical fiber 24a which functions as a light incidence port; the filter 25 passes the light of wavelength $\lambda_2$ while it reflects light of wavelength $\lambda_1$. Light of wavelength $\lambda_2$ that has passed through the filter 25 is transmitted via the combined side 22c of the Y-branched waveguide 14 to the optical fiber 24c, which functions as a light output port. On the other hand, light of wavelength $\lambda_1$ that has been reflected by the filter 25 is branched according to the branching proportions implemented by the branch portion 28 to the side branches 22a and 22b of the Y-branched waveguide 14, and, as is for example shown in the same figure, the major portion of this reflected light of wavelength $\lambda_1$ is transmitted via the side branch 22b to the optical fiber 24b.

In FIG. 6, as another example of a light division device of the abovementioned multi layer interference film filter type, there is shown a light division device disclosed in Japanese Patent Laying Open Publication Serial No. Showa 62-218909. In this light division device, in the same manner as the light division device shown in FIG. 7, a Y-branched waveguide 14 is formed upon a base substrate (not shown in the figure); while, with the light division device shown in FIG. 6, a filter insertion groove 4 is formed in a branch portion 28 of the Y-branched waveguide 14, and a filter element 20 which is made up from a wavelength division filter 5 and a filter substrate 13 is provided in this filter insertion groove 4. The filter substrate 13 is formed from quartz or polyimide, and upon this filter substrate 13 a wavelength division filter 5 of multi-layer interference film filter type which consists of for example 20 layers or more of transparent films or the like is formed, so as to constitute the filter element 20. The wavelength division filter 5 is constituted so as, when light is incident thereupon which has two components of wavelengths $\lambda_1$ and $\lambda_2$, to pass the light of wavelength $\lambda_2$, while it reflects the light of wavelength $\lambda_1$.

The angle of intersection between the wavelength division filter 5 and the side branch 22a and the combined side 22c of the Y-branched waveguide 14 is termed α (α=82°), and the thickness of the wavelength division filter 5 is termed R, the thickness of the filter substrate 13 is termed K, and the thickness of the filter element 20 is termed T. Since the wavelength division filter 5 is formed as a multi-layer interference film filter, light of the wavelength $\lambda_1$ incident upon this filter 5 is reflected by each layer by a corresponding predetermined proportion. In this specification, the surface which reflects 100% of the light of wavelength $\lambda_1$ is defined as the equivalent reflecting facet, and in FIG. 6 the equivalent reflecting facet 6 of the wavelength division filter 5 is formed at a position whose depth (thickness) from the filter surface 15 is termed r. The angle of intersection with the side branches 22a and 22b of the Y-branched waveguide 14 is termed 2 θ, and the intersection portion gap is termed S. Moreover, this intersection portion gap S is determined by the value of the intersection angle 2 θ with the side branches 22a and 22b, and it is not possible to reduce the magnitude of this intersection portion gap 5, provided that the value of the intersection angle 2 θ is not changed.

With this light division device, in the same manner as with the optical division device shown in FIG. 7, wavelength division of the light of wavelength $\lambda_1$ and the light of wavelength $\lambda_2$ is also performed by the wavelength division filter 5, and it is possible to fulfill the same type of function.

FIG. 8A shows a light separation device of the directional coupler waveguide type, and in this light division device, part way along a pair of light propagation paths 17 and 18 which are arranged with a gap between them, these two light propagation paths 17 and 18 are formed so as to be brought close to one another and a directional coupler device 26 is provided, and, by utilizing the coupling length difference of the directional coupler device 26 for the light wavelengths Ps and Pc of the light which is incident into the light propagation path 17, light beams of the two wavelengths Ps and Pc are separated to a through port (for example, in the figure, Ps) and a cross port (for example, in the figure, Pc). Further, as a light separation device of the Mach Zehnder interferometer waveguide type, as shown in FIG. 8B, a device is constructed in which directional coupler devices 26 are provided in series part way along a pair of light propagation paths 17 and 18 which are arranged with a gap between them; a phase alteration portion 27 provides an optical path length difference ΔL between the light propagation paths 17 and 18 and is provided between this directional coupler device 26. By setting the values of this path length difference ΔL and of the coupling length of the directional coupler device 26 appropriately, the incident light may be properly separated according to its wavelength.

OBJECTS AND SUMMARY OF THE INVENTION

However, when manufacturing an optical wavelength division multiplexer device which employs such a light division device of the directional coupler waveguide type or such a light division device of the Mach-Zehnder interferometer waveguide type, a problem arises; it is difficult to try to make the device more compact since the length of the device is long; and furthermore it becomes difficult to produce such a device in large numbers efficiently, since during production it is always necessary to perform the process with great accuracy. Accordingly the problem arises that the cost is relatively high, and at present optical wavelength division multiplexer devices which utilize these light division devices have not attained practical utility.

Further, with the Y-branched filter type of light wavelength division device shown in FIG. 7, there is no requirement for performing high accuracy processes such as were required with the light wavelength division devices shown in FIGS. 8A and 8B, and reduction in size of the device can be anticipated. However, since the filter 25 which has the function of wavelength division is provided more towards the combined side 22c than the branch portion 28 of the Y-branched waveguide 14, light of wavelength $\lambda_1$ that is reflected by the filter 25, according to the theory of reversibility, in the branch portion 28, is branched according to a predetermined branching ratio and is divided between the side branches 22a and 22b and then is transmitted to the respective optical fibers 24a and 24b. Due to this, the entire amount of light of wavelength $\lambda_1$ is not transmitted to the optical fiber 24b, and an increase occurs in loss of the optical power of the light of wavelength $\lambda_1$ since only a part of this light is transmitted to the optical fiber 24b, so that the strength of the light of wavelength $\lambda_1$ which is transmitted to the side of the optical fiber 24b is reduced and the problem arises that the reflectivity is remarkably deteriorated; and, further, the light which is divided by the branch portion 28 of the Y-branched waveguide 14 is transmitted into the optical fiber 24a in the reverse direction to the incident light, and the problem arises that the isolation characteristic is remarkably deteriorated, since such returning light of the wavelength $\lambda_1$ is present.

With the device shown in FIG. 6, by providing the wavelength division filter 5 in the branch portion 28 of the Y-branched waveguide 14, the loss of reflected light of wavelength $\lambda_1$ which was a problem with the device of FIG. 7 is ameliorated. However, due to the fact that the contact width between the filter surface 15 of the wavelength division filter 5 and the Y-branched waveguide 14 is relatively wide, it becomes easier for the propagation mode to become multi mode or reflection mode, and the problem arises of occurrence of radiation loss and mode mismatch loss.

Further, in the region from the equivalent reflecting surface 6 of the wavelength division filter 5 to the place of contact between the side branches 22a and 22b of the Y-branched waveguide 14 (in the figure, G1+G2+G1'+G2'; however, G1=G1' and G2=G2'), mutual action is generated between the incident light of wavelengths $\lambda_1$ and $\lambda_2$ and the reflected light of wavelength $\lambda_1$ which is reflected by the wavelength division filter 5, and since loss is caused by this, the problem arises that the transmission loss of light of wavelength $\lambda_1$ incident upon this light wavelength division device becomes relatively large. Due to this, even with this type of light wavelength division device, it has not been possible to attain low loss, high isolation, and high optical extinction ratio. As described above, problems have arisen with whichever of the above described light wavelength division devices that have been proposed in the prior art, and it has not been possible to construct a light wavelength division device which is compact, low in cost, and which nevertheless exhibits low transmission loss and low reflection loss for the incident light, while also having high isolation and high optical extinction ratio.

The present invention has been made with a view to solving the above described problems, and its object is to propose an optical wavelength division multiplexer device which is compact and low in cost, and which nevertheless exhibits low transmission loss and low reflection loss for the incident light, while also having high isolation and high optical extinction ratio.

In order to attain the above described object, the present invention proposes an optical wavelength division multiplexer device, comprising: an input and output optical waveguide which is formed as rectilinear; a filter member provided part way along the input and output optical waveguide, which intersects the input and output optical waveguide at an angle less than 90°, and which comprises a wavelength division filter which passes light having a filter through wavelength determined in advance which is included in incident light having a plurality of wavelengths which is incident upon the input and output optical waveguide, and which reflects light of a wavelength which differs from the filter through wavelength in a direction separated from the direction of the input and output optical waveguide; and a reflected light reception means, which receives the reflected light, and which is provided in the reflection direction of the light which is reflected by the wavelength division filter with a gap being left between it and the input and output optical waveguide.

Further, according to particular specializations of the concept of the present invention, the reflected light reception means may desirably be constituted by a reflected light reception waveguide of rectilinear form; the reflected light reception waveguide may be arranged with its reflected light reception end being proximate to the input and output optical waveguide so as to minimize the distance to the equivalent reflecting facet of the wavelength division filter. And the reflected light reception end of the reflected light reception waveguide may be formed as a widened taper, and the reflected light reception means is constituted by a hybrid integration of at least one, or of more than one, photodiode.

Further, according to another particular aspect of the concept of the present invention, a light incident side of the input and output optical waveguide may be formed as an incident light propagation portion which propagates incident light into the input and output optical waveguide, with a light emission side of the input and output optical waveguide being formed as a through light propagation portion which propagates transmitted light which has passed through the wavelength division filter, and one or the other of the reflected light reception end of the reflected light reception means and a received light after end portion at the other end thereof constituting a reflected light propagation section which propagates the reflected light reflected by the wavelength division filter to the outside, or an interference light transmission section which transmits from the outside interference light having the same wavelength as the reflected light.

According to the present invention as specified above, the light of the filter pass wavelength, contained within the light which has a plurality of wavelengths which is incident upon the input and output optical waveguide, passes through the filter. On the other hand, the light of a different wavelength from the filter pass wavelength is reflected in a direction which is separated from the input and output optical waveguide to the side of the reflected light reception means which is provided with the gap between it and the input and output optical waveguide. Wavelength division of the incident light is performed by this transmission and reflection of the light.

According to the present invention as described above, by providing the wavelength division filter part way along the input and output optical waveguide which is formed as rectilinear, by comparison with a prior art optical wavelength division multiplexer device in which the wavelength division filter was provided at the branch portion of the Y-branched waveguide, it becomes possible to narrow the width of the contact portion between the wavelength division filter and the optical waveguide, and by doing this it is possible to prevent increase of radiation loss and mode mismatch loss and the like which arise from the propagation mode becoming multi mode or reflection mode.

Further, according to the present invention, by providing the reflected light reception means that receives the light which is reflected by the wavelength division filter with a gap being left between it and the input and output optical waveguide, it becomes possible to prevent the occurrence of mutual action between the light which is incident into the input and output optical waveguide and the reflected light which has been reflected into the reflected light reception means, and it becomes possible to reduce the length of the gap which causes an unwanted influence due to this mutual action upon the incident light, the reflected light, and the through light that has passed through the wavelength division filter; so that it is possible to reduce the through loss and the reflection loss due to the existence of this gap. For this reason, with the optical wavelength division multiplexer device of the present invention, the through loss and the reflection loss are low, and moreover it becomes possible to produce an optical wavelength division multiplexer device that has high isolation and whose optical extinction ratio is excellent. Furthermore, since the length of the optical waveguide does not become long as with a light separation device of the directional coupler waveguide type or the Mach-Zehnder interferometer waveguide type, and since it is not necessary always to perform control processes which have a high degree of accuracy, therefore it is possible to construct an optical wavelength division multiplexer device that is compact and whose cost is low.

Yet further, according to the present invention, by constituting the reflected light reception means by a reflected light reception waveguide, and by arranging the reflected light reception waveguide with its reflected light reception end being proximate to the input and output optical waveguide so as to minimize the distance to the equivalent reflecting facet of the wavelength division filter, thereby the gap between the reflecting facet of the wavelength division filter and the reflected light reception end of the reflected light reception waveguide is made as short as possible, whereby it is possible to reduce the loss due to this gap in accordance therewith.

Yet further, according to the present invention, by constituting the reflected light reception means by a reflected light reception waveguide, and by forming the reflected light reception end of this reflected light reception waveguide as a widened taper, it is possible to elevate the light reception efficiency of the reflected light reception waveguide for the reflected light, and by doing this it is possible further to reduce the loss of the reflected light.

Even yet further, according to the present invention, by constituting the reflected light reception means by a hybrid integration of at least one, or of more than one, photodiode, thereby, when an optical signal transmission system is constructed using the optical wavelength division multiplexer device of the present invention, for example, with this optical wavelength division multiplexer device as the light reception section of the optical signal transmission system, then it becomes possible directly to receive the reflected light by these photodiodes and to convert it into an electrical signal.

Finally, according to the present invention, by forming a light incident side of the input and output optical waveguide as an incident light propagation portion which propagates incident light into the input and output optical waveguide, with a light emission side of the input and output optical waveguide being formed as a through light propagation portion which propagates transmitted light that has passed through the wavelength division filter, and one or the other of the reflected light reception end of the reflected light reception means and a received light after end portion at the other end thereof constituting a reflected light propagation section which propagates the reflected light reflected by the wavelength division filter to the outside, or an interference light propagation which conducts from the outside interference light having the same wavelength as the reflected light, thereby it is possible efficiently to utilize the optical wavelength division multiplexer device either as a device which has one input and two outputs, or as a device which has two inputs and one output, according to requirements for the optical wavelength division multiplexer device.

These and other objects and advantages of the present invention will become more apparent and more readily appreciated from the following detailed description of the exemplary embodiments of the invention, taken in conjunction with the accompanying drawings, in which.

DETAILED DESCRIPTION OF THE PREFERRED EMBODIMENTS

The first preferred embodiment of the present invention will now be explained with reference to the figures.

Figure 1:
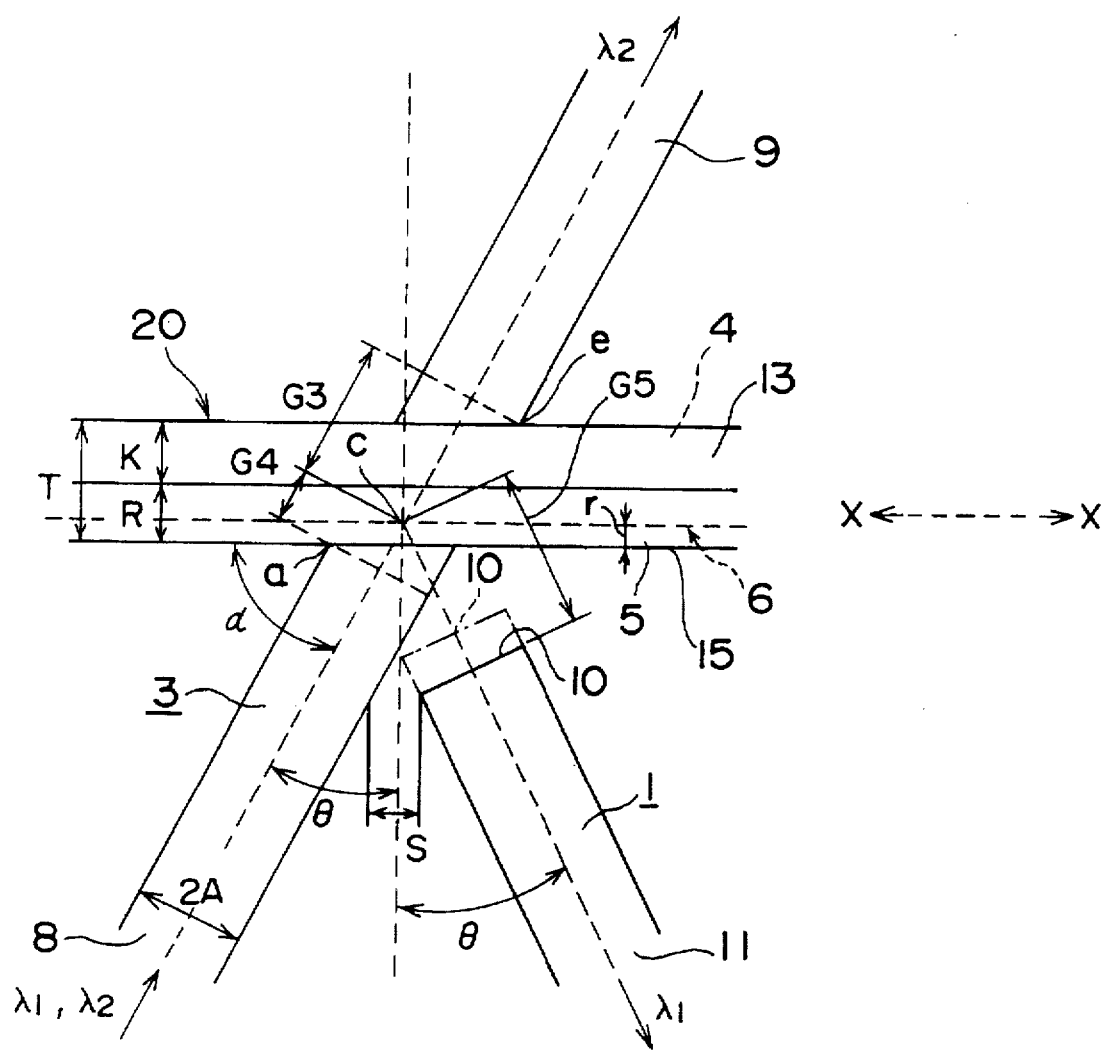
FIG. 1 is a structural view showing essential elements of a first preferred embodiment of the optical wavelength division multiplexer device according to the present invention.

Moreover, in this description of the first preferred embodiment, parts which correspond to parts in the prior art described above will be denoted by the same reference symbols, and repeated descriptions will be curtailed. In FIG. 1 there are shown essential structural elements of a first preferred embodiment of the optical wavelength division multiplexer device according to the present invention. In this figure, part way along a rectilinear formed input and output optical waveguide 3 there is formed a groove for filter insertion 4 which intersects this input and output optical waveguide 3 at an angle that is not a right angle. In the same manner as in the prior art shown in FIG. 6, a filter element 20 which comprises a wavelength division filter 5 and a filter base plate 13 is disposed in this groove for filter insertion 4, and, when an incident light beam which is a combination of light beams of wavelengths $\lambda_1$ and $\lambda_2$ is incident upon this wavelength division filter 5 from an incident side 8 of the input and output optical waveguide 3, this wavelength division filter 5 allows the light of wavelength $\lambda_2$ included in this incident light beam to pass through it. Further, this wavelength division filter 5 is made so as to reflect light of wavelength $\lambda_1$ in a direction angled away from the direction of the input and output optical waveguide 3, and in the direction in which this reflected light beam is reflected there is arranged a reflected light reception waveguide 1 of rectilinear form, which receives this reflected light beam and thus serves as a reflected light reception means.

Figure 7:
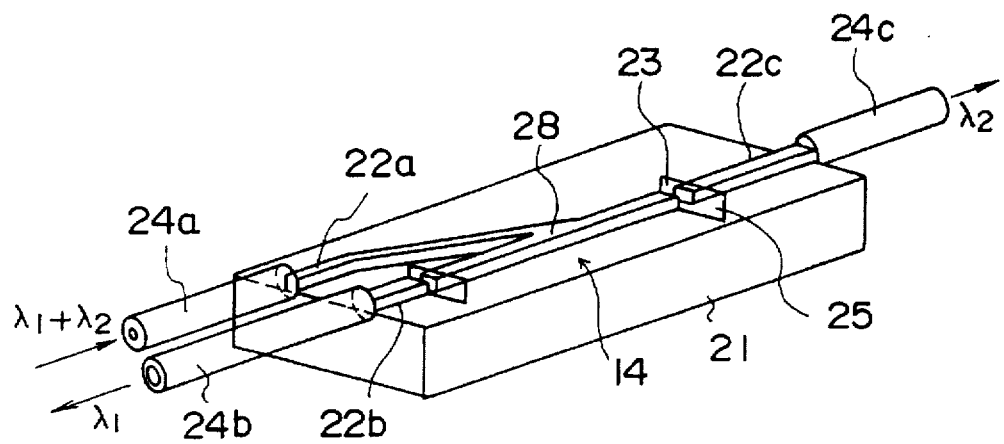
FIG. 7 is an explanatory view showing essential elements of another exemplary prior art optical wavelength division multiplexer device; and, FIGS. 8A and 8B are explanatory views showing essential elements of yet other exemplary prior art optical wavelength division multiplexer devices.

The light incident side 8 of the input and output optical waveguide 3 is formed as an incident light lead-in portion which leads in light that is incident upon the input and output optical waveguide 3, and this light incident side 8, for example, may be connected to an optical such as optical fiber 24a shown in FIG. 7. Further, a light emission side 9 of the input and output optical waveguide 3 is formed as a transmitted light propagation portion which transmits out light that has been transmitted through the wavelength division filter 5; this light emission side 9, for example, may be connected to an optical fiber for conducting out transmitted light like the optical fiber 24c which is shown in FIG. 7. On the other hand, a received light transmission section 11 of the reflected light reception waveguide 1 is formed as reflected light transmission sections which transmit to the outside, light that has been reflected by the wavelength division filter 5; this reflected light transmission section 11, for example, may be connected to an optical fiber for output reflected light such as the optical fiber 24b shown in FIG. 7.

Moreover, with the optical wavelength division multiplexer device of this preferred embodiment, the width of the input and output optical waveguide 3 and the width of the reflected light reception waveguide 1 are both arranged to be the same and herein will be termed 2 A (where A=4 μm while the angle between the optical axis of the input and output optical waveguide 3 and the optical axis of the reflected light reception waveguide 1 will herein be termed 2 θ, where θ=90°−α. Further, the distance in the x-axis direction between the input and output optical waveguide 3 and the reflected light reception end 10 of the reflected light reception waveguide 1 will herein be termed S (which in this first preferred embodiment equals about 1.55 μm); and, it is so arranged that this distance S is equal to the intersection portion interval S between the side branches 22a and 22b of the Y-branched waveguide in the optical wavelength division multiplexer device according to the prior art shown in FIG. 6.

Figure 6:
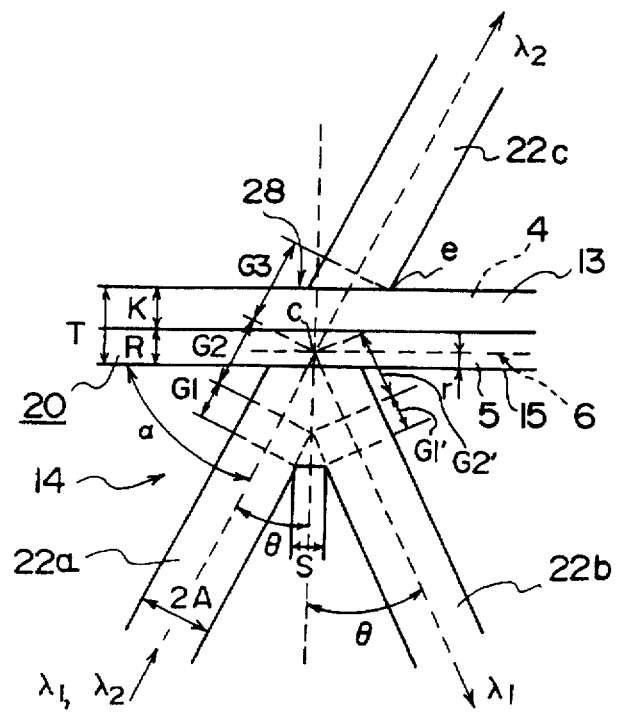
FIG. 6 is an explanatory view showing essential elements of an exemplary prior art optical wavelength division multiplexer device.

Further, herein, the thickness of the wavelength division filter 5 will be termed R, the thickness from the filter surface 15 of the wavelength division filter 5 to its reflecting facet 6 will be termed r, the thickness of the filter base plate 13 will be termed K, and the thickness of the filter element which includes the filter base plate 13 and the wavelength division filter 5 will be termed T, and all of these thicknesses are arranged to be the same as the corresponding thicknesses for the prior art optical wavelength division multiplexer device shown in FIG. 6. In the shown first preferred embodiment, their values are respectively T=20 μm and r=4.5 μm, so that T−r=15.5 μm.

As described above, the optical wavelength division multiplexer device of this first preferred embodiment is formed so that its dimensions and the like are almost the same as those of the prior art optical wavelength division multiplexer device shown in FIG. 6. The particular characteristic point by which the device of the first preferred embodiment differs from the example of the prior art shown in FIG. 6 is that a gap is provided between the input and output optical waveguide 3 and the reflected light reception end 10 of the reflected light reception waveguide 1, or, to put it in another manner, that the device is constructed just as though a waveguide of Y-branched cross sectional form was defined by the input and output optical waveguide 3 and the reflected light reception waveguide 1. In the following, the optical wavelength division multiplexer device of this first preferred embodiment will be termed a Y-cutting type filter division device, and the prior art optical division device shown in FIG. 6 will be termed a Y-linked type filter division device.

The optical wavelength division multiplexer device of the present invention (a Y-cutting type filter division device) may, for example, be fabricated by a process such as described below. First, a lower clad layer made from quartz material and a core layer are superposed upon a substrate (not shown in the figures) which is made of silicon Si or glass, for example by a flame hydrolysis deposition method or the like, and are vitrified; and then, after a ridge core formation process which produces patterning has been performed, an upper clad layer is further superposed thereupon by flame hydrolysis deposition, and thus an embedded waveguide is formed by a process of vitrification. Next, a filter insertion groove 4 is formed by a mechanical process or by using a dry etching method, so as to intersect this embedded waveguide at an intersection angle less than 90°, and a filter element 20 which is made up from a wavelength division filter 5 and a filter base plate 13 is accurately positioned and inserted into this filter insertion groove 4. And next the filter 20 is fixed in the filter insertion groove 4 using an optical adhesive which has almost the same refractive index as this quartz waveguide, so that the gap of the filter insertion groove 4 is completely closed up. Moreover, in this first preferred embodiment, the angular deviation of the perpendicular of the reflecting facet G is less than 0.5°, and its positional deviation is less than 2 μm. Further, optical fibers (not shown in the figure) are connected to the light incident side 8 and to the light emission side 9 of the input and output optical waveguide 3 and to the received light transmission section 11 of the reflected light reception waveguide 1, so as to complete the construction of this optical wavelength division multiplexer device.

Moreover, if the refractive index of the core layer which is incorporated in the input and output optical waveguide 3 and in the reflected light reception waveguide 1 is termed $n_{core}$, and the refractive index of the cladding layer around this core layer is termed $n_{clad}$, then the refractive index deviation Δ, which is given by the following equation (1), is 0.3% for this first preferred embodiment.

$$\Delta = (n_{core}^2 - n_{clad}^2)/2 n_{core}^2 \tag{1}$$

Next, a second preferred embodiment of the optical wavelength division multiplexer device according to the present invention will be described. The construction of this second preferred embodiment is the same as that of the first preferred embodiment, and accordingly it will also be explained with reference to FIG. 1. The points by which this second preferred embodiment differs from the first preferred embodiment described above, are that the relative refractive index A between the core layer and the cladding layer is 0.75%, and that the various parameters for the abovementioned intersection angle etc. are $\alpha=78°$, $\theta=12°$, and $A=3$ μm.

Here, for example, by the filter 15 being inserted into the optical waveguide, by the optical waveguides crossing one another, and bandgap being provided between the optical waveguides, this becomes a region which exerts an influence upon the light which is being transmitted in the optical waveguide, i.e. a so called gap is created. For example, in this second preferred embodiment, a gap of gap length G4 is created in the region from the point a where the filter surface 15 of the wavelength division filter 5 first intersects with an edge of the input and output optical waveguide 3 to the point c of intersection between the reflecting facet 6 and the optical axis of the input and output optical waveguide 3. Further, a gap of gap length G3 is created in the region from this point c to the point e where an edge of the input and output optical waveguide 3 first intersects with the bottom surface of the filter base plate 13, and also a gap of gap length G5 is created between the point c and the reflected light reception end 10 of the reflected light reception waveguide 1.

In the same manner, in the prior art example shown in FIG. 6, a gap of gap length (G1+G2) is created upon both of the branch sides 22a and 22b of the Y-branched waveguide 14 in the region from the point of intersection between the branch sides 22a and 22b to the point c of intersection between the reflecting facet 6 of the wavelength division filter 5 and the optical axis of the input and output optical waveguide 3; and a gap of gap length G3 is created in the region from the intersection point c to the point e of intersection with the bottom surface of the filter base plate 13. The values of these gaps G1 through G5 are determined by the value of the above described angle of intersection $\alpha$ (or the value of $\theta=90°-\alpha$) and the value of the optical waveguide width 2 A, and for the first preferred embodiment described above, in which $\theta=8°$ and $A=4$ μm, $G4=5.1064$ μm, $G3=16.215$ μm, and $G5=35.647$ μm; while, for the second preferred embodiment described above, in which $\theta=12°$ and $A=3$ μm, $G4=5.2382$ μm, $G3=16.484$ μm, and $G5=18.924$ μm. And, for the prior art example of FIG. 6, just as in the first preferred embodiment described above, $\theta=8°$ and $A=4$ μm, and thus the values of G1 through G3 are $G1=7.1853$ μm, $G2=28.462$ μm, and $G3=16.215$ μm; while, for a second comparison example in which, just as in the second preferred embodiment described above, $\theta=12°$ and $A=3$ μm, accordingly $G1=4.8097$ μm, $G2=14.114$ μm, and $G3=16.484$ μm.

In this connection, all of the gap lengths G of the above described first and second preferred embodiments are determined based upon these gap lengths G1 through G5. Furthermore, in order to measure the through loss for light of wavelength $\lambda_2$ and the reflection loss for light of wavelength $\lambda_1$, the present applicant has performed tests by directing a beam of incident light including light of wavelength $\lambda_2=1.3$ μm and light of wavelength $\lambda_1=1.55$ μm upon the light incident side 8 of the input and output optical waveguide 3, for each of the first preferred embodiment and the second preferred embodiment described above, and has measured the through loss and the reflection loss, i.e. the gap losses. The results of these measurements are shown in Table 1. Moreover, by way of providing examples for comparison, two examples of the Y-linked type filter wavelength division device of FIG. 6 were produced with each of the parameters such as the intersection angle and so on being arranged to be the same as in the two embodiments described above respectively, and the total gap length G and the through-loss and the reflection-loss were measured in the same manner. The results of these measurements are shown in Table 2.

Figure 2:
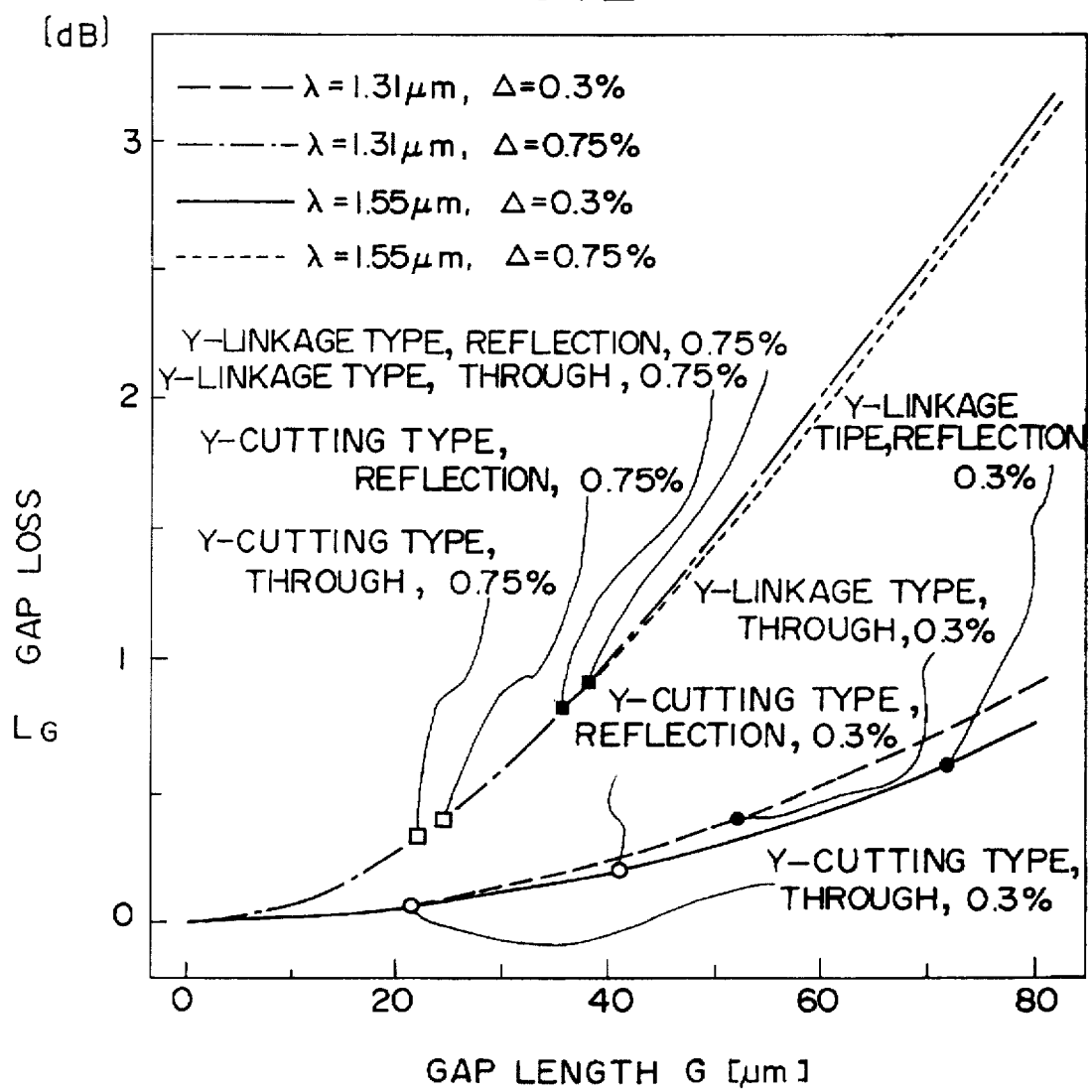
FIG. 2 is a graph showing the relationship between a gap length G and a gap loss LG for the comparison of Y-cutting and Y-linkage type wavelength division multiplexer.

Further, FIG. 2 shows the data relationship between the gap length (the total gap length) G and the gap loss LG, as obtained based upon the results of these measurements of through loss and of reflection loss for the gaps shown in Tables 1 and 2.

TABLE 1

| | Wave length | Gap length (μm) | | | Total gap length G (μm) | Gap loss (dB) |
|---|---|---|---|---|---|---|
| | | G4 | G3 | G5 | | |
| first embodiment $\Delta = 0.3\%$ $\theta = 8°$ $A = 4$ μm | 1.3 μm ($\lambda_2$) | 5.1064 | 16.215 | — | G4 + G3 = 21.3209 | 0.072 |
| | 1.55 μm ($\lambda_1$) | 5.1064 | — | 35.647 | G4 + G5 = 40.7532 | 0.212 |
| second embodiment $\Delta = 0.75\%$ $\theta = 12°$ $A = 3$ μm | 1.3 μm ($\lambda_2$) | 5.2382 | 16.484 | — | G4 + G3 = 21.7221 | 0.331 |
| | 1.55 μm ($\lambda_1$) | 5.2382 | — | 18.924 | G4 + G5 = 24.1618 | 0.396 |

TABLE 2

| | Wave length | Gap length (μm) | | | Total gap length G (μm) | Gap loss (dB) |
|---|---|---|---|---|---|---|
| | | G4 | G3 | G5 | | |
| $\Delta = 0.3\%$ $\theta = 8°$ $A = 4$ μm | 1.3 μm ($\lambda_2$) | 7.1853 | 28.462 | 16.215 | G1 + G2 + G3 = 51.86 | 0.41 |
| | 1.55 μm ($\lambda_1$) | 7.1853 | 28.462 | — | 2(G1 + G2) = 71.29 | 0.62 / 0.62 |
| $\Delta = 0.75\%$ $\theta = 12°$ $A = 3$ μm | 1.3 μm ($\lambda_2$) | 4.8097 | 14.114 | 16.484 | G1 + G2 + G3 = 35.41 | 0.83 |
| | 1.55 μm | 4.8097 | 14.114 | — | 2(G1 + G2) = 37.85 | 0.91 |

As will be clear from these results, even when the devices shown in FIGS. 1 and 6 are constructed so that the values of the various parameters $\alpha$, $\theta$, A, S, T, K, R, and r are the same, the length G2 of the gap whose influence is received by the through light of the above described transmission wavelength $\lambda_2$ is (G4+G3) for Y-cutting type filter wavelength division devices like these two preferred embodiments of the present invention, which is smaller than the corresponding gap length (G1+G2+G3) for Y-linked type filter wavelength division devices like the prior art devices which were tested, and due to this the through loss suffered by the transmitted light beam due to this gap is smaller. Further, the length G of the gap whose influence is received by the light of the above described reflection wavelength $\lambda_1$ which is reflected by the wavelength division filter 5 is (G4+G5) for Y-cutting type filter wavelength division devices like these two preferred embodiments of the present invention, which is smaller than the corresponding gap length 2(G1+G2) for Y-linked type filter wavelength division devices like the prior art devices which were tested, and due to this the reflection loss suffered by the reflected light beam due to this gap is smaller.

According to these preferred embodiments, as described above, by providing a gap between the input and output optical waveguide 3 and the reflected light reception end 10 of the reflected light reception waveguide 1 so as to make a Y-cutting type filter wavelength division device, it is possible to make the values of the gap lengths G which exert influence upon light of the respective wavelengths $\lambda_1$ and $\lambda_2$ both smaller, as compared with a Y-linked type filter wavelength division device as in the prior art, and thereby it is possible to reduce the through loss and the reflection loss suffered by the transmitted and reflected light beams due to these gaps.

Further, according to these preferred embodiments, the wavelength division filter 5 is provided part way along the input and output optical waveguide 3 which is formed as rectilinear, and accordingly this wavelength division filter 5 differs from the prior art ones which are provided in the branch portion 28 of the Y-branched waveguide 14. Accordingly, since the contact width of the wavelength division filter 5 and the optical waveguide is narrow, there is no invitation to increase of radiation loss or to mode mismatch loss due to the wave transmission mode easily being multi mode or radiation mode, and thereby it is possible to provide an optical wavelength division multiplexer device of high isolation and of high optical extinction ratio.

Figure 8A:
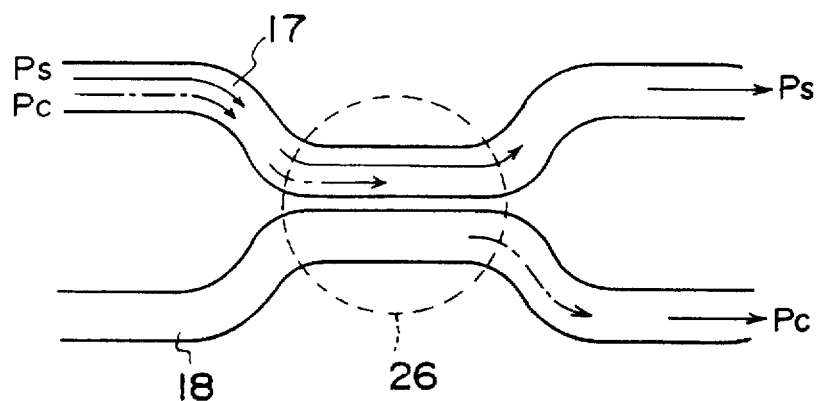
Figure 8B:
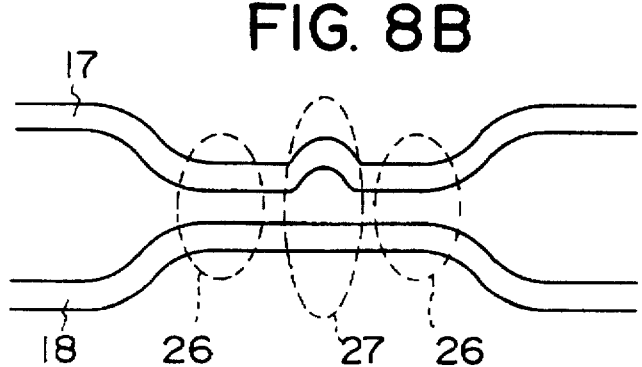

Yet further, according to these preferred embodiments, the optical path is constituted by the input and output optical waveguide 3 which is formed as rectilinear and by the reflected light reception waveguide 1; the length of the waveguide is not long as with an optical wave division device of the directional coupler waveguide type such as shown in FIG. 8 or with an optical wave division device of the Mach-Zehnder interferometer waveguide type, and it is also possible to implement reduction in size of the optical wavelength division multiplexer device and to benefit from reduction of the cost thereof, since it is not always necessary to employ control processes which are of high accuracy.

Figure 3:
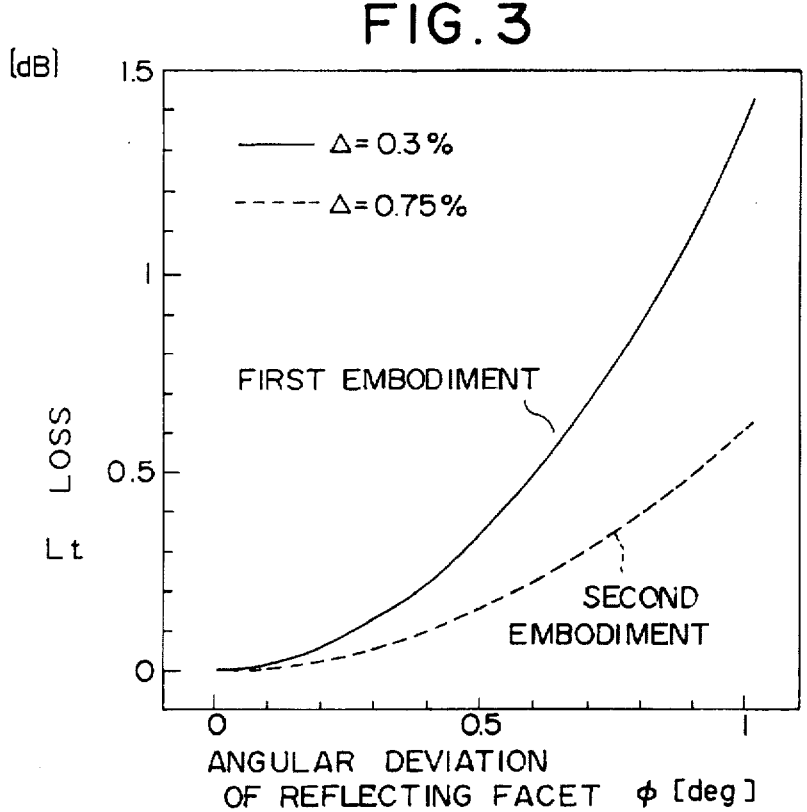
FIG. 3 is a graph showing the theoretical relationship between the amount of angular deviation of a reflecting facet of a wavelength division filter and the associated loss with respect to the relative refractive index $\Delta$.
Figure 4:
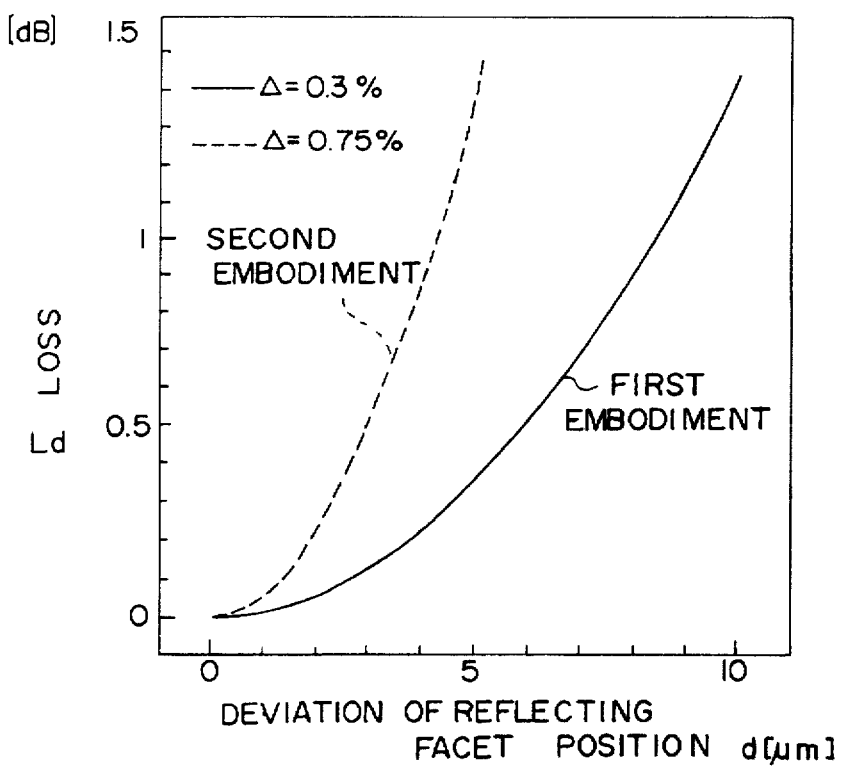
FIG. 4 is a graph showing the theoretical relationship between the positional deviation of this reflecting facet of this wavelength division filter and the associated loss with respect to the relative refractive index $\Delta$.

Moreover, in FIGS. 3 and 4, for both the first and the second preferred embodiments, there are respectively shown the angular deviation of the reflecting facet 6 of the wavelength division filter 5 and a theoretical characteristic relationship graph of the loss Lt with respect to this facet angular deviation, and the positional deviation of this reflecting facet 6 of the wavelength division filter 5 and a theoretical characteristic relationship graph of loss Ld with respect to this facet positional deviation. As will be clear from these figures, although when angular or positional deviation of the reflecting facet 6 is present, the loss due thereto comes to be increased; nevertheless, since in the optical wavelength division multiplexer device of the present invention the actually measured values of the angular deviation of the reflecting facet 6 and of its positional deviation are less than 0.5° and 2 μm respectively, hence the losses due to these angular and positional deviations are relatively small. In actual practice, it has been checked that the reflection loss for the reflected light beam of wavelength $\lambda_1$=1.55 μm including that due to the angular deviation and positional deviation of the reflecting facet 6 of the wavelength division filter 5 is less than 1 dB, while also it has been checked that the through loss for the transmitted light beam of wavelength $\lambda_2$=1.3 μm is less than 0.6 dB.

Further, in actual practice, although the propagation loss of the transmitted light of wavelength $\lambda_1$ (1.55 μm) from the light incident side 8 of the input and output optical waveguide 3 to the light emission side 9 thereof is greater than 40 dB, while the propagation loss of the reflected light of wavelength $\lambda_2$ (1.3 μm) from the light incident side 8 of the input and output optical waveguide 3 to the received light transmission section 11 of the reflected light reception waveguide 1 is greater than 20 dB, these have both been checked in practice experimentally, and it has been demonstrated that the optical wavelength division multiplexer devices according to the first and second preferred embodiments described above are devices which have high isolation and a high optical extinction ratio.

Figure 5:
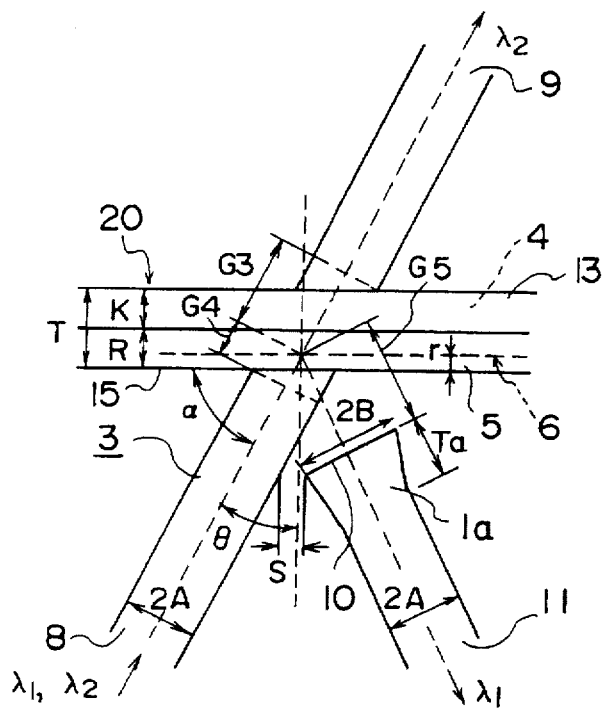
FIG. 5 is a structural view showing essential elements of another preferred embodiment of the optical wavelength division multiplexer device according to the present invention.

In FIG. 5, there are shown the essential elements of a third preferred embodiment of the optical wavelength division multiplexer device according to the present invention. In this third preferred embodiment, the essential point of difference from the above described first preferred embodiment is that the reflected light reception end 10 of the reflected light reception waveguide 1 is widened out so as to define a tapered form reception waveguide portion 1a. This tapered form reception waveguide portion 1a is formed only over a length Ta of the reflected light reception waveguide 1 from its reflected light reception end 10, and its width at the reflected light reception end 10 is equal to 2 B. Moreover, in this third preferred embodiment, this tapered form reception waveguide portion 1a is formed as a symmetric widening of the reflected light reception waveguide 1 towards its left and right sides. Apart from the above matter, the construction of this third preferred embodiment is identical to that of the first preferred embodiment described previously.

The third preferred embodiment of the present invention is constructed as described above, and operates in a manner identical to that of the first and second preferred embodiments described above, and is capable of offering the same beneficial effects. Further, with regard to this third preferred embodiment, since the reflected light reception end 10 of the reflected light reception waveguide 1 is widened out so as to define the tapered form reception waveguide portion 1a, and since thereby the reflected light reception waveguide 1 is enabled more effectively to receive the reflected light of wavelength $\lambda_1$ which has been reflected from the reflecting facet 6 of the wavelength division filter 5, thus, even if more or less angular deviation or positional deviation or the like of the reflecting facet 6 of the wavelength division filter 5 is present, it is nevertheless possible to receive the reflected light beam without suffering any undue influence due to these deviations.

Moreover, the present invention is not to be considered as being limited to the above described preferred embodiments thereof; various other embodiments are also possible. For example, although with the above described third preferred embodiment the tapered form reception waveguide portion 1a is formed as being symmetrical with respect to the left and right sides of the reflected light reception waveguide 1, this is not essential to the concept of the present invention; when forming the tapered form reception waveguide portion 1a, it would also be possible to form it as an asymmetrically widened tapered portion.

Further, although in the above described preferred embodiments the distance S in the X-axis direction between the input and output optical waveguide 3 and the reflected light reception end 10 of the reflected light reception waveguide 1 was formed as equal to the intersection portion gap S of the prior art type optical wavelength division multiplexer device of FIG. 6, this is not to be considered as being limitative of the present invention; for example, as an alternative, it would also be possible, as shown in FIG. 1 by the single dotted lines, to form the optical wavelength division multiplexer device of the present invention with the reflected light reception end 10 of the reflected light reception waveguide 1 being approached more closely to the input and output optical waveguide 3, so as thereby to reduce the distance S in the X-axis direction between the input and output optical waveguide 3 and the reflected light reception end 10 of the reflected light reception waveguide 1. By reducing the value of the distance S in this manner as much as possible, i.e. by disposing the reflected light reception waveguide 1 so as to bring it as close as possible to the input and output optical waveguide 3, in order to make the distance between the reflected light reception end 10 of the reflected light reception waveguide 1 and the reflecting facet 6 of the wavelength division filter 5 as short as possible, it is possible to reduce the magnitude of the gap G5 shown in FIG. 1 to an extremely small value, and thereby it is possible to minimize the value of the reflection loss for the reflected light beam due to this gap.

Further, with the above described preferred embodiments of the present invention, the reflected light reception waveguide 1 is provided as a reflected light reception means, but the reflected light reception means is not necessarily limited to being such a reflected light reception waveguide 1, and, for example, it would be possible to form the reflected light reception means by hybrid integration of at least one photodiode, or of more than one thereof. Moreover, when constructing the reflected light reception means as a hybrid integration of a plurality of photodiodes in this manner, it is also acceptable to form these photodiodes in a unitary manner with the input and output optical waveguide 3 by a semiconductor fabrication technique or the like; or it is also acceptable, as an alternative, to attach the hybrid integration of photodiodes to the input and output optical waveguide 3 using optical adhesive or the like, after the input and output optical waveguide 3 has been formed.

Yet further, although in the above described preferred embodiments of the present invention the optical wavelength division multiplexer device was formed as a device which had one input and two outputs, so that the beam of incident light was is to be incident upon the light incident side 8 of the input and output optical waveguide 3, and the beam of transmitted light of wavelength $\lambda_2$ emitted from the light emission side 9 thereof, while the beam of reflected light of wavelength $\lambda_1$ is emitted from the received light transmission section 11 of the reflected light reception waveguide 1, this is not to be considered as limitative of the present invention; for example, it would also be possible to form the received light transmission section 11 as an interference light propagating portion, so that interference light, having the same wavelength $\lambda_1$ as the above described reflected light and with its phase moreover being shifted 180° from that of the reflected light, is incident from the received light transmission section 11 of the reflected light reception waveguide 1. When this is done, the reflected light beam of wavelength $\lambda_1$ and the interference light beam interfere with one another and are canceled, and thereby only the transmitted light beam of wavelength $\lambda_2$ is emitted from the light emission side 9 of the input and output optical waveguide 3, and this optical wavelength division multiplexer device comes to serve the function of a device which has two inputs and one output.

Further, the values of the various parameters of the optical wavelength division multiplexer device of the present invention, such as the angle of intersection $\alpha$ and the like, are not to be considered as being particularly limited; the optical wavelength division multiplexer device of the present invention can be manufactured, provided that the angle of intersection $\alpha$ is set to an angle other than 90°, and provided moreover that a gap is furnished between the waveguide 3 and the reflected light reception means. Yet further, the filter through wavelength and the reflection wavelength and the like of the wavelength division filter 5 which is suitable for the optical wavelength division multiplexer device of the present invention may be set suitably, and by setting these wavelengths to values which are suitable, it is possible to provide an optical wavelength division multiplexer device which is able to separate light of the desired wavelengths with low loss and moreover with good optical isolation.

Even furthermore, although in the above described preferred embodiments of the present invention the construction is such that the light incident side 8 and the light emission side 9 of the input and output optical waveguide 3, and the received light transmission section 11 of the reflected light reception waveguide 1, is connected to respective optical fibers, it is also acceptable to connect other optical devices, instead of optical fibers.

Accordingly, although the present invention has been shown and described in terms of certain preferred embodiments thereof, it is not to be considered as limited by any of the perhaps quite fortuitous details of these embodiments or of the drawings, but only by the terms of the appended claims, which follow.

What we claim is:

1. An optical wavelength division multiplexor device, comprising: a unitary input and output optical rectilinear waveguide which has a first end with first port and a second end with a second port, and is arranged to guide lightwaves along a first direction; a filter member provided in said input and output optical waveguide between said first and second ends, said filter member intersecting said input and output optical waveguide at an angle less than 90° and comprising a wavelength division filter for passing light having a first predetermined wavelength in a direction different from said first direction of said input and output optical waveguide, said filter member dividing said optical waveguide into a single wavelength portion and a multi-wavelength portion; an intermediate port located at said multi-wavelength portion and positioned to pass light reflected from said wavelength division filter; and, a reflected light reception means for receiving said reflected light which is reflected by said wavelength division filters, with a gap being arranged between said reflected light reception means and said input and output optical waveguide.

2. An optical wavelength division multiplexer device according to claim 1, wherein said reflected light reception means is comprised of a reflected light reception waveguide of rectilinear form, and said reflected light reception waveguide being arranged with its reflected light reception end being proximate to said input and output optical waveguide so as to minimize the distance to the equivalent reflecting facet of said wavelength division filter.

3. An optical wavelength division multiplexer device according to claim 2, wherein said reflected light reception end of said reflected light reception waveguide is formed as a widened taper.

4. An optical wavelength division multiplexer device according to claim 1, wherein said reflected light reception means comprises a hybrid integration of at least one, or of more than one, photodiode.

5. An optical wavelength division multiplexer device according to claim 1, wherein a light incident side of said input and output optical waveguide is formed as an incident light propagation portion for propagating incident light into said input and output optical waveguide, a light emission side of said input and output optical waveguide being formed as a through light propagation portion which propagates transmitted light which has passed through said wavelength division filter, and one or the other of said reflected light reception end of said reflected light reception means and a received light after end portion at the other end thereof comprises a reflected light propagation section which propagates the reflected light reflected by said wavelength division filter to the outside, or an interference light propagation section which conducts from the outside interference light having the same wavelength as said reflected light.

6. An optical wavelength division multiplexer device according to claim 2, wherein a light incident side of said input and output optical waveguide is formed as an incident light propagation portion for propagating incident light into said input and output optical waveguide, a light emission side of said input and output optical waveguide being formed as a through light propagation portion which propagates transmitted light which has passed through said wavelength division filter, and one or the other of said reflected light reception end of said reflected light reception means and a received light after end portion at the other end thereof comprises a reflected light propagation section which propagates the reflected light reflected by said wavelength division filter to the outside, or an interference light propagation section which conducts from the outside interference light having the same wavelength as said reflected light.

7. An optical wavelength division multiplexer device according to claim 3, wherein a light incident side of said input and output optical waveguide is formed as an incident light propagation portion for propagating incident light into said input and output optical waveguide, a light emission side of said input and output optical waveguide being formed as a through light propagation portion which propagates transmitted light which has passed through said wavelength division filter, and one or the other of said reflected light reception end of said reflected light reception means and a received light after end portion at the other end thereof comprises a reflected light propagation section which propagates the reflected light reflected by said wavelength division filter to the outside, or an interference light propagation section which conducts from the outside interference light having the same wavelength as said reflected light.

8. An optical wavelength division multiplexor device, comprising: a unitary input and output optical rectilinear waveguide which has a first end with a first port and a second end with a second port, and is arranged to guide lightwaves along a first direction; a filter member provided in said input and output optical waveguide which intersects said input and output optical waveguide at an angle less and other than 90° and comprising a wavelength division filter which passes light having a first predetermined wavelength which is included in incident light having a plurality of wavelengths which is incident upon said input and output optical waveguide and which reflects light of a wavelength which differs from said first wavelength in a direction different from the first direction of said input and output optical waveguide, said filter member dividing said optical waveguide into a single wavelength port located at said multi-wavelength portion and positioned to pass light reflected from said wavelength division filter; and, reflected light reception means, for receiving said reflected light which is reflected by said wavelength division filter, with a gap being arranged between said reflected light reception means and said input and output optical waveguide.

* * * * *